July 26, 1927.
J. I. HULL
1,637,040
SELF EXCITED INDUCTION MOTOR
Filed Feb. 9, 1924   2 Sheets-Sheet 1
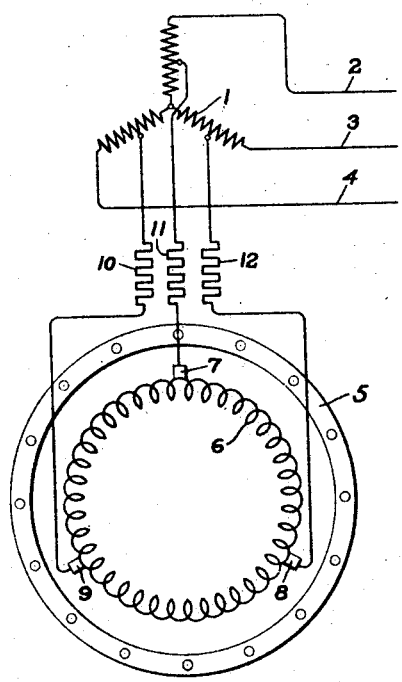
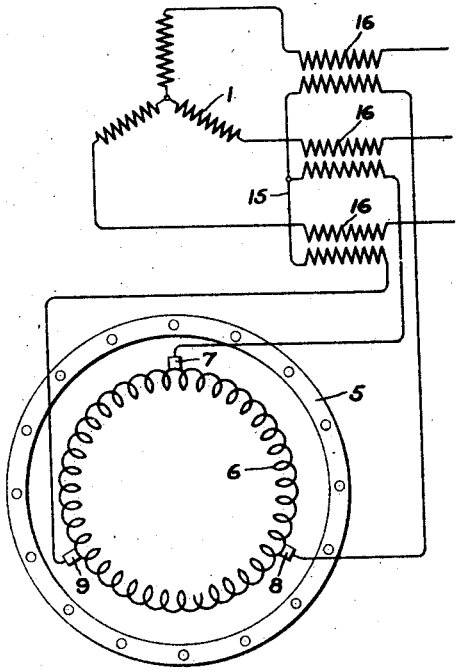
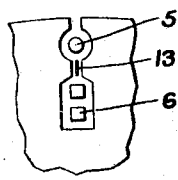
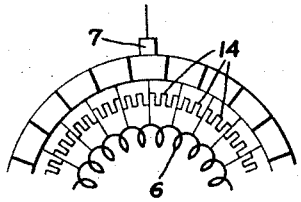
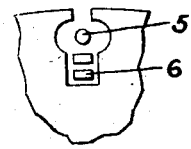
Inventor:
John I. Hull,
by *Alexander T. Lewis*
His Attorney.

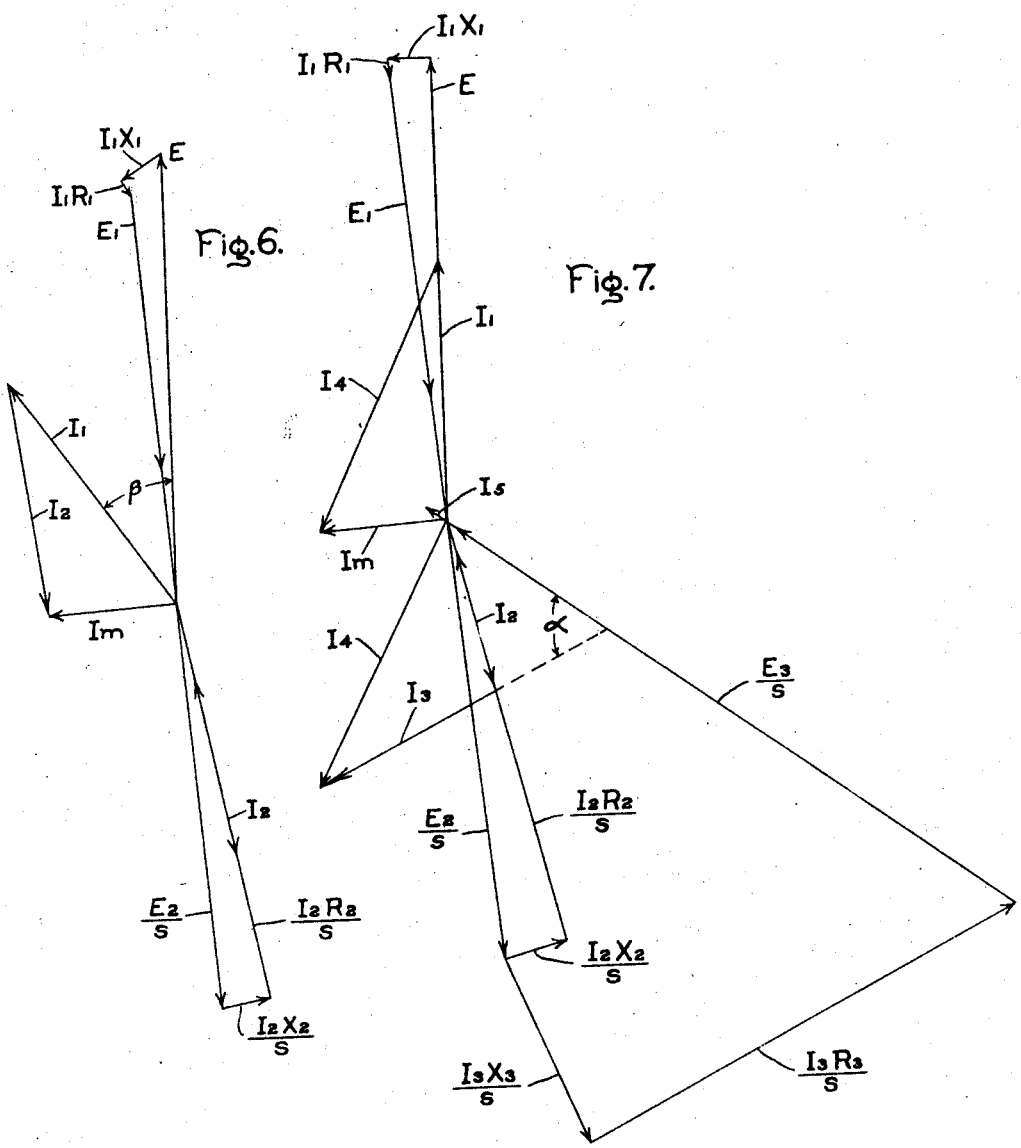

Patented July 26, 1927.

1,637,040

UNITED STATES PATENT OFFICE.

JOHN I. HULL, OF SCHENECTADY, NEW YORK, ASSIGNOR TO GENERAL ELECTRIC COMPANY, A CORPORATION OF NEW YORK.

SELF-EXCITED INDUCTION MOTOR.

Application filed February 9, 1924. Serial No. 691,795.

My invention relates to alternating current motors, and has for its object the provision of simple and reliable improved means for controlling the power factor of an induction motor.

It is well known that the current supplied from an alternating current line to an induction machine differs in phase from the impressed voltage because of the fact that this current is required to establish the magnetic field of the machine. Thus in the case of an induction motor the primary current lags somewhat behind the impressed voltage. This phase difference is not constant but decreases as the load of the motor is increased from zero to its full value. In order to maintain unity power factor at all loads of the motor it is therefore necessary to supply the magnetizing current independently of the primary circuit. Owing to the effect of the leakages there is still some tendency for the currents to lag. For practical purposes, however, it is satisfactory to arrange the motor to operate with unity or other high value of power factor only at a single load or within a more or less limited range of loads. Under these conditions the component voltage injected into the secondary circuit to shift the magnetizing current out of the primary is approximately constant and of a value adapted to produce a high primary power factor within the range of loads at which the motor is most commonly operated. Above and below this range of loads the power factor will of course change in value. In accordance with my invention a commutator exciting winding placed in deeply embedded slots upon the same core as the motor secondary winding and deriving its voltage from the supply line in any suitable manner is utilized to supply the magnetizing current of the motor.

My invention will be better understood on reference to the following description when considered in connection with the accompanying drawing and its scope will be pointed out in the appended claims.

In the accompanying drawings, Fig. 1 shows a motor in which my invention has been embodied; Fig. 2 shows one arrangement by which the reactance voltage due to commutation of the exciting winding is suppressed; Fig. 3 shows a different means for suppressing the reactance voltage of commutation; Fig. 4 differs from Fig. 1 in that the exciting winding derives its voltage from a current transformer connection in the primary leads of the motor; Fig. 5 illustrates a modified arrangement of the rotor windings; and Figs. 6 and 7 are vector diagrams illustrating the operation of the machine.

Fig. 1 shows an induction motor, the stator member of which is provided with a polyphase primary winding 1 operatively associated with a polyphase line comprising conductors 2, 3 and 4 and the rotor member of which is provided with a secondary winding 5 shown as a squirrel cage, and a commutator exciting winding 6 which is of normal direct current motor construction. The commutator winding 6 is wound for the same number of poles as the primary winding 1 and is located in a series of slots preferably situated further from the rotor surface than the slots which contain the squirrel cage winding 5, the corresponding slots in the two sets being in each case connected by a narrow slot as indicated in Fig. 2. The brushes 7, 8 and 9 of the exciting winding 6 are connected to taps on the primary winding 1 through resistors 10, 11 and 12 which may be provided for the purpose of minimizing the effect of the voltage induced in the exciting winding by the primary current. It is of course obvious that a potential transformer connected to the polyphase line, a separate winding on the stator in the same slots as the winding, or any other suitable means may be used to impress on the exciting winding 6 any desired percentage of the primary voltage.

Aside from the exciting winding 6 and connections thereto, the machine illustrated by Fig. 1 is in all respects a normal squirrel cage induction motor which, when brought up to its normal operating range of speeds, will run with small slip from synchronous speed like any induction motor. The exciting winding 6 therefore has but a small slip voltage induced in it and may be designed to carry the magnetizing ampere turns needed for the machine, the voltage impressed on the brushes from the primary source being of such value as to force the necessary current through the exciting circuit.

The operation of the machine will be more readily understood on reference to the vector diagrams of Figs. 6 and 7, Fig. 6 showing the current and voltage relations existing in the induction motor when provided with a primary and secondary winding alone and Fig. 7 showing how these relations are affected by the addition of the exciting winding. In drawing these diagrams it has been assumed that each of the three windings have the same number of turns and, for the purpose of facilitating their drawing and examination, the vectors representing the voltages of the secondary and exciting winding have been made to represent these voltages divided by the slip of the motor. The meanings of the various reference characters applied to these figures are as follows:—

$E$—primary terminal voltage.
$I_1 X_1$—primary inductive drop.
$I_1 R_1$—primary resistance drop.
$E_1$—voltage generated in primary by air gap flux.
$I_1$—primary current.
$I_2$—secondary current.
$I_m$—magnetizing current.
$S$—slip.
$E_2$—secondary voltage.
$I_2 X_2$—secondary inductive drop.
$I_2 R_2$—secondary resistance drop.
$E_3$—voltage injected into exciting winding.
$I_3 X_3$—reactive drop of the exciting winding.
$I_3 R_3$—resistance drop of exciting winding.
$I_3$—current of exciting winding.
$I_4$—resultant current of both secondary and exciting windings.
$I_5$—current drawn by the exciting winding from the primary circuit.
$\alpha$—angle of lag of $I_3$ behind $E_3$.
$\beta$—angle by which $I_1$ lags behind $E$.

It will be observed that the magnetizing current $I_m$ of the machine in Fig. 6 is the resultant of the primary current $I_1$ and the secondary current $I_2$. In Fig. 7 the same relation must hold as in all motors of the induction type, but in place of $I_2$ it is necessary to substitute $I_4$ which is the resultant of the current $I_2$ in the winding 5 and the current $I_3$ in the exciting winding. A comparison of Figs. 6 and 7 shows that, while in Fig. 6 the primary current $I_1$ lags behind the impressed voltage $E$ by the angle $\beta$, in Fig. 7 the angle $\beta$ has become zero and the primary current $I_1$ is in phase with the impressed voltage $E$. Under these conditions the machine will operate at unity power factor. It must therefore follow that the magnetizing current of the machine is produced by the voltage $E_3$ injected into the exciting winding 6. The magnitude of the voltage $E_3$ is determined by the ratio of the transformer or by the point in the primary winding of the machine to which the connections from the brushes are tapped, or, if a separate regulating winding on the primary member of the machine is used, by the ratio of this winding to the main primary winding. Its phase relation to the other quantities is determined by the phase relation existing in the transformer, or by the taps to the primary winding, or by the positioning of the regulating and primary windings and the proper selection of the brush position. The selection of the brush position of course affords complete freedom in the choice of phase and will be the only adjustment to which any practical attention will be paid.

The starting characteristics of the motor are much the same as those of an ordinary squirrel cage induction motor. The main flux tends to pass through the exciting winding due to the reluctance of the path across the slits between the deeply embedded and the peripheral slots. At standstill the voltage impressed by the primary source upon the exciting winding is small as compared to the voltage which would be induced in the exciting winding were it arranged to cut the full working flux of the machine because most of the working flux of the motor passes across the slits between the corresponding slots in the different sets. The exciting winding in effecting the passage of the flux across the slits carries a sufficient magnetizing current to force the working flux across them. There is therefore induced in the exciting winding no very excessive current or voltage so that good commutation can be produced during starting without serious complications.

This arrangement gives the exciting winding a high leakage reactance with respect to the squirrel cage winding. Accordingly when the motor is running the reversal of the current during commutation generates an abnormally great reactance voltage of commutation and means for suppressing this voltage are desirable.

Fig. 2 indicates one means of suppressing this reactance voltage. In this figure strips of resistance material 13 are shown as inserted in the slits between the two sets of slots. With this arrangement the reactance per cycle is greatly reduced at high frequencies due to eddy currents set up in the strips of high resistance material. Since the commutation frequency is of the order of several thousand cycles while the maximum operating frequency is 60 cycles, it will be readily understood that by this means, with a given reactive effect at starting, much better commutation can be obtained at full speed with the high resistance strips 13 than would otherwise be possible.

Fig. 3 shows a second means of improving commutation. In this arrangement the commutator leads are interconnected by high resistance conductors 14. The resistance of these conductors is made of such a value that when running normally near synchronous speed the bulk of the excitation current passes through the windings rather than through the resistance. That is to say, each portion of the high resistance conductor has several times as many ohms as the corresponding portion of the winding which is in multiple with it. It is quite apparent that during commutation each time a commutator segment leaves the brush this high resistance conductor will serve as a discharge path for the commutated portion of the winding allowing the electromagnetic energy which has been stored to discharge itself through the resistance rather than create a spark at the brush.

Fig. 4 shows an arrangement which differs from that shown by Fig. 1 in that the brushes of the exciting winding are connected to the secondary winding 15 of a current transformer having its primary winding 16 connected in series with the primary leads of the motor. In this modification the rotor windings may be arranged as indicated in Fig. 2 if it is desired to sacrifice starting torque to improve commutation during starting. The starting torque may be improved by interchanging the positions of the rotor windings. With this arrangement the motor will have close speed regulation when running in the neighborhood of synchronism and the series transformer and the exciting winding should be designed to carry a substantial part of the energy current rather than merely the exciting current.

Fig. 5 illustrates the rotor windings as located in the same slots. In this case both at starting and during running most of the energy current is carried by the squirrel cage winding while the exciting winding carries little current in excess of that required for excitation. Under these conditions both the starting torque and the torque per ampere are somewhat better than would be the case were the machine functioning as a plain squirrel cage motor but commutation during starting is rendered more difficult due to the fact that the exciting winding is more closely related to the working flux of the machine.

While the secondary winding of the machine has been illustrated and described as of the squirrel cage type it may obviously be replaced by a polyphase winding adapted to be operatively associated with a rheostat provided for purposes of starting and speed control. Other obvious modifications will readily occur to those skilled in the art. I, accordingly, do not wish to be restricted to the particular forms of construction disclosed herein by way of example for the purpose of setting forth my invention in accordance with the patent statutes. The terms of the appended claims are, therefore, not restricted to the precise structure disclosed, but are intended to cover all changes and modifications within the spirit and scope of my invention.

What I claim as new and desire to secure by Letters Patent of the United States is:—

1. An induction motor comprising primary and secondary core members, a primary winding on said primary core member, a secondary winding wound in a set of slots near the periphery of said secondary core member, and an exciting winding inductively associated with said primary winding for supplying the magnetizing current of said motor and wound in a set of slots located beneath said peripheral slots, the radial slots in the two sets being interconnected by slits to increase the magnetic reluctance of the core therebetween.

2. An induction motor comprising primary and secondary core members, a primary winding on said primary core member, a secondary winding wound in a set of slots near the periphery of said secondary core member, and a commutator winding inductively and conductively associated with said primary winding for supplying the magnetizing current of said motor, said commutator winding being wound in a set of slots located beneath said peripheral slots, said commutator winding being connected only to and supplying magnetizing current only to said primary winding.

3. An induction motor comprising primary and secondary core members, a primary winding on said primary core member, a secondary winding wound in a set of slots near the periphery of said secondary core member, a commutator winding inductively associated with said primary winding and wound in a set of slots located beneath said peripheral slots for supplying the magnetizing current of said motor, and high resistance strips interposed in slits between the corresponding slots in the two slot sets for reducing sparking at the brushes of said commutator winding.

4. An induction motor comprising primary and secondary core members, a primary winding on said primary core member, a secondary winding wound in a set of slots near the periphery of said secondary core member, a commutator winding wound in a sets of slots beneath said peripheral slots having no electrical connection with said secondary winding but conductively and inductively associated with said primary winding for supplying the magnetizing current of said motor, and leads interconnecting said exciting winding with said primary windings including means for reducing the voltage injected into said exciting winding by the primary electromotive force of the motor.

In witness whereof, I have hereunto set my hand this 7th day of February, 1924.

JOHN I. HULL.